(12) United States Patent
Earl et al.

(10) Patent No.: US 6,809,839 B1
(45) Date of Patent: Oct. 26, 2004

(54) SYSTEM AND METHOD FOR RENDERING PRINTING TRAPS WITH APPLICATION OF COLOR TRANSFORMATIONS

(75) Inventors: David John Earl, Fulbourn (GB); Andrew William Cave, Oakington (GB)

(73) Assignee: Global Graphics Software Limited, Cambridge (GB)

(*) Notice: Subject to any disclaimer, the term of this patent is extended or adjusted under 35 U.S.C. 154(b) by 549 days.

(21) Appl. No.: 09/870,936

(22) Filed: May 30, 2001

(Under 37 CFR 1.47)

Related U.S. Application Data

(60) Provisional application No. 60/209,041, filed on Jun. 2, 2000.

(51) Int. Cl.[7] .............................................. G06R 15/00
(52) U.S. Cl. ...................... 358/1.9; 358/2.1; 358/3.09; 382/164
(58) Field of Search ................................ 382/164, 165; 358/2.1, 3.09, 3.27, 530; 101/93.47

(56) References Cited

U.S. PATENT DOCUMENTS 4,931,861 A * 6/1990 Taniguchi .................. 382/167
5,530,656 A * 6/1996 Six .............................. 702/108
5,848,180 A   12/1998 Coleman ..................... 382/162
5,848,225 A   12/1998 Nickell ....................... 395/109
6,465,969 B1 * 10/2002 Murasko et al. ......... 315/169.3

FOREIGN PATENT DOCUMENTS

EP          0322680 A2 * 5/1989 ............ H04N/1/46

* cited by examiner

Primary Examiner—Jerome Grant, II
(74) Attorney, Agent, or Firm—Darby & Darby

(57) ABSTRACT

A system and method for handling overprinting in generating a raster page for continuous tone or halftone printing. A color transformation is used to generate tints for each of the colorants for each of the colored shapes. When rendering a shape that is set for overprinting, the tints of colorant for each pixel is determined by comparing the colorant tints determined by the color transformation of the foreground shape with the colorant tints previously determined for the pixel according to the background. The pixel colorant tints are reset with the colorant tints of the foreground shape when the tints of the foreground shape are darker than the tints of the background. Where the tints of the foreground shape are lighter than the background, the background tints are left unchanged producing a transparency effect. The system and method are adaptable to colored shapes comprising a vignette. The system and method are also applicable to negative image production.

15 Claims, 9 Drawing Sheets

CYAN PLATE     MAGENTA PLATE     PRINTED SHEET

CYAN PLATE     MAGENTA PLATE     PRINTED SHEET

SYSTEM AND METHOD FOR RENDERING PRINTING TRAPS WITH APPLICATION OF COLOR TRANSFORMATIONS

This application claims priority from U.S. Provisional Application Ser. No. 60/209,041 filed Jun. 2, 2000 which is hereby incorporated by reference.

FIELD OF THE INVENTION

The invention relates to reproduction of pages described by a page description language. More particularly, the invention relates to reproduction of traps which are described in such pages in the context of color transformations.

BACKGROUND OF THE INVENTION

Full color printing is typically carried out by producing four or more printing plates, one for each of the color inks used on a printing press, typically Cyan, Magenta, Yellow and Black. The plates are configured to selectively apply the different colors to desired portions of the printing medium. To reproduce, for example, a Cyan circle on a square Magenta background, the Magenta plate must be configured such that no Magenta ink is applied in the intended area of the Cyan circle, i.e, the Magenta plate is defined as a square with a circular "hole" corresponding to the location of the Cyan circle, as shown schematically in FIG. 1.

Unfortunately, a printing press is generally not capable of perfectly aligning the printed areas produced by each of the inking stations (e.g., plates). This mis-registration of color may leave highly visible white "slivers" at the borders between adjacent colored areas. In the example described above, a thin crescent shaped area may be visible between the Cyan circle and the Magenta background, as shown schematically in FIG. 2.

A process called "trapping" is typically applied to reduce the visual impact of the misregistrations described above. Referring to the example above, a thin line in the same color as the circle (i.e. Cyan) may be added around the circle, while the corresponding "hole" in the Magenta plate is unchanged. This results in mixing of colors along a narrow transition area, a blue area in the above example, which is generally a much less noticeable artifact than the alternative white transition area between the two regions, assuming that the mis-registration area is narrower than (i.e., completely covered by) the overprinted area. The overprinting area in the above example, generally referred to as "trap", is illustrated schematically in FIG. 3.

It is often desired to proof the printed pages before initiating voluminous final printing. Proofing is typically performed on a color printer capable of producing copies quickly and inexpensively. Because the inks and dyes used on these printers are generally not the same as those used on the printing press, color transformations are applied to the colors on the page to make the resultant combinations of colors, i.e., Cyan, Magenta, Yellow and Black, produce a proof print with colors as similar as possible to the colors that would eventually be printed by the printing press.

In the above example, to render a reasonable color approximation for the pure Cyan to be produced by the printing press, the Cyan circle on the proof may be calculated to require a smaller percentage of the proof printer's Cyan ink than the 100% to be used by the printing press, while small amounts of Magenta, Yellow and/or Black ink may be added to provide a correct approximation.

To produce a proof of the trap around the circle, the trap should be printed in an appropriate color. In the example above, if the Cyan color of the solid circle is to be used as the basis for the trap transformation, then a small amount of Magenta may be required in order to obliterate the larger amount of Magenta of the square. This way, the trap would not be visible in the proof, as shown schematically in FIG. 4. Alternatively, if the trap is not printed at all, the circle appears in the proof without a trap.

When using a continuous tone raster, it is possible to take the Cyan component from the overprinted trap, and the Magenta component from the underlying square, and to use that combination for the color transformation. This enables the blue color of the trapped area to be accurately represented.

However, a continuous tone raster is not always available. In many printing devices, colors are reproduced by screening whereby each pixel represents either 'ink' or 'no ink'. Visually continuous tones may be emulated on such devices by varying the proportion of ink to no-ink pixels over a printed area. When the dots are sufficiently small, the printed area is perceived as a shade of color instead of a collection of individual dots.

Typically the pixels in a screened area are clumped together in screen dots. Darkening is achieved by adding more pixels to the clump. Brightening is achieved by deleting pixels from the clump, i.e., a brighter screen dot may be produced by a subset of the pixels of a corresponding darker dot. It is not necessary to store a continuous tone raster in order to produce the screened raster; in fact, it is advantageous not to store continuous tone rasters because their size requires additional processing.

Additionally, in certain applications, it may be desired to apply different color transformations to different parts of a page. For example, picture or image portions of a page may be treated differently from line-art portions of the page. Such differentiation on a continuous tone raster requires that each pixel be identified with a corresponding color transformation, thereby further increasing the size of continuous tone rasters. Therefore, it is advantageous to perform the color transformation before rasterizing the page.

Further still, certain types of proofing device require "serial" color delivery, whereby all of the ink or dye of a given colorant is delivered to the printing medium prior to the delivery of another colorant. Because color transformations require access to the tint values of all the inks or dyes, applying color transformations to a continuous tone raster requires simultaneous access to the tint values of all the colorants in order to produce a single resultant color. This scheme requires either a large amount of computer memory or repeated iterations over the entire stored a raster to produce each color.

It is noted that transforming the color of each pixel in an area of a given color is a tedious, memory consuming process. While there are known techniques for expediting the transformation of each pixel, such color transformations require significant memory usage. Further, if a continuous tone raster is not available for reference, when rasterizing a trap of a given shape and color, the color for the transformation cannot be synthesized.

In view of the above, there is a need for alternative, more efficient, methods for reproducing traps in printing of proofs.

SUMMARY OF THE INVENTION

An aspect of the present invention is based on the notion that the exact color of a trap is often not important, for example, it is rarely important in proof printing. While it is generally important to reasonably approximate the colors of traps, to properly remove visual artifacts on a proof, it is generally not important that the overlapping areas of the traps be printed in exact colors. For example, when the color transformation of pure Cyan (as in the above example) requires adding a small amount of Magenta and the trap overlaps a region printed with a larger amount of Magenta, it is generally unnecessary to reproduce the Magenta of the trap in the proof. However, when the color transformation requires adding a large amount of Magenta, for example, in regions where the color transformation results in a significant redistribution of colors (particularly Black versus the others colors) or where the background color is relatively faint, it is necessary to print the Magenta of the trap in order to produce an effective trap.

It is an object of the invention to provide a method of reproducing traps, e.g., in proof printing, wherein the colors of shapes are transformed independently of their background, assuming for the purposes of color transformation that the overprinted colors of traps would knock out. This results in a transformation of a trap in the same color as an adjacent solid color, e.g., the Cyan circle in the above example. However, in accordance with an aspect of the invention, the transformed component of an overprinting color is not reproduced if it is found to use less ink, i.e., to have a lower tint value, than the color to be overprinted (i.e., the color of the background) in the output raster.

According to one aspect of the invention, suitable for continuous tone rasters, when overprinting, the tint value of each colorant of each pixel in the calculated raster is compared with a corresponding transformed tint value, and the pixel is replaced only if its tint value is smaller than the transformed tint value. This is in contrast with painting models as are known in the art, wherein a new opaque color always replaces the old or wherein a shape is not rendered at all for the overprinted color.

According to another aspect of invention, suitable for use with halftone screened pages, the method utilizes the fact that a lighter screen dot may be formed from a proper subset of pixels of a corresponding darker screen dot. When rendering an overprinted area using a screen, the invention enables printing of the darker of the new color and the background by applying only the inked pixels of the screen (leaving the non-inked pixels as they were in the background), instead of applying both the inked and non-inked pixels of the screen to the raster. The method in accordance with this aspect of the invention is effective because, if the new color is lighter than the background color, all the inked dots applied to the overprinted area are inked anyway, forming part of the larger screen dot of the darker background, and if the new color is darker than the background, then the newly inked dots cover the background as well as additional dots.

Therefore, in both continuous tone and halftone renditions, for the overprinted color components, the resultant color of the new shape is a physical combination of the colorants of each of the transformed color representations, wherein the tint value for each colorant is the larger of the foreground and the background. This is not calorimetrically equivalent to transforming a combination of the color components of the new shape that knock out the background and the overprinted components from the knocked out background. However, it is a reasonable approximation which results in the reproduction of an effective trap on the proof. Further, this approximation enables the colors to be transformed without reference to the background, using screened backgrounds if required. The color transformation in accordance with the invention may vary from shape to shape.

Additionally, according to the invention, the color transformation may be performed only once for each shape, rather than once for each pixel in the raster (as in the prior art).

When the overprinted area is a vignette, i.e., a region in which the color changes from light to dark or from one color to another, the method of the invention may include a further step of determining which colors should be overprinted with the transformed trap. As is known in the art, a vignette typically consists of a series of thin shapes ("steps"), each step having a color slightly different from adjacent steps. According to the embodiment of the invention described above, only colorants that have a zero tint value before transformation are overprinted. However, unlike solid color regions, a vignette may include zero-value tinted steps adjacent to non-zero value tinted steps.

If each and every zero value tinted step in the vignette were to be overprinted using the technique described above (when color transformation is involved) or using conventional trap reproduction techniques (when color transformation is not applied), the background would show through only in one of the steps. To obtain an effective trap, however, the background should only show through vignettes that have a zero-value tint in each and every step. Therefore, once it is determined that a collection of steps forms a vignette, the set of color components to be overprinted (conventionally or using the technique of the invention described above) is determined by the conjunction of the sets of zero color components of all the steps in the vignette.

It is noted that certain vignettes are formed in a page description language by drawing successively smaller shapes one on top of another, wherein each shape completely encloses subsequent shapes. For such configurations, rendering of the vignette in accordance with the invention includes a reorganization whereby colorant values are compared between the vignette elements and the background, and not between successive vignette elements.

BRIEF DESCRIPTION OF THE DRAWINGS

The invention will be understood and appreciated more fully from the following detailed description of preferred embodiments of the invention, taken in conjunction with the following drawings in which.

DETAILED DESCRIPTION OF THE INVENTION

A page in accordance with the present invention may be described, for example, using either a PostScript® page description language or PDF (Portable Document File) format, by one of a large number of desktop publishing applications capable of generating such page descriptions.

Figure 1:
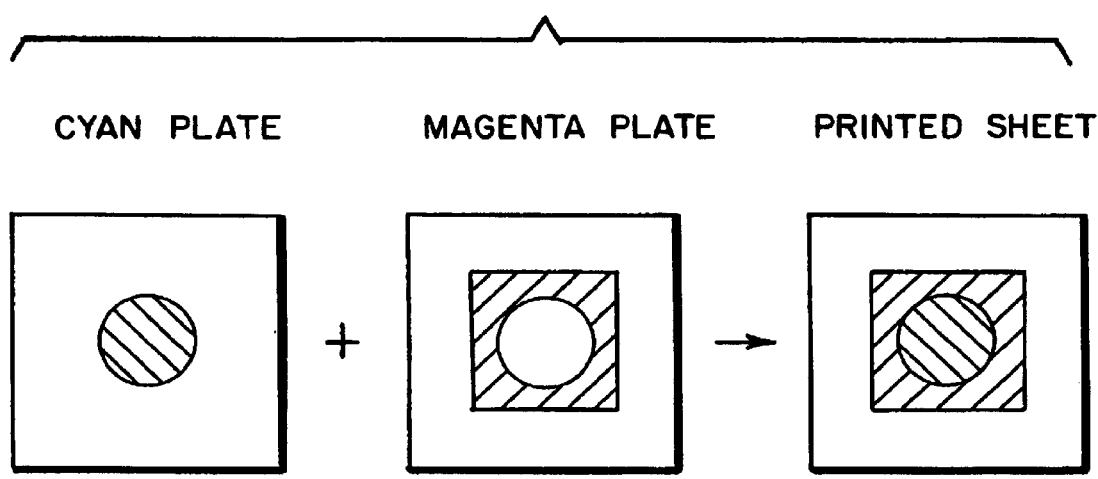
FIG. 1 schematically illustrates an example of printing of a multicolor page wherein different color shapes are formed on separate printing plates as is know in the art.
Figure 2:
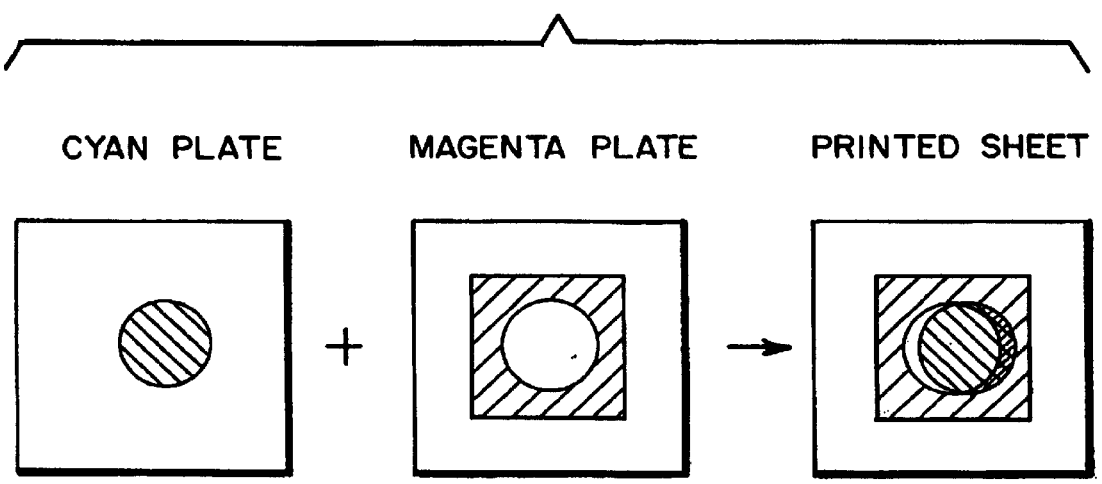
FIG. 2 schematically illustrates mis-registration (improper alignment) of the colors on a multicolored printed sheet with reference to the example of FIG. 1.
Figure 3:
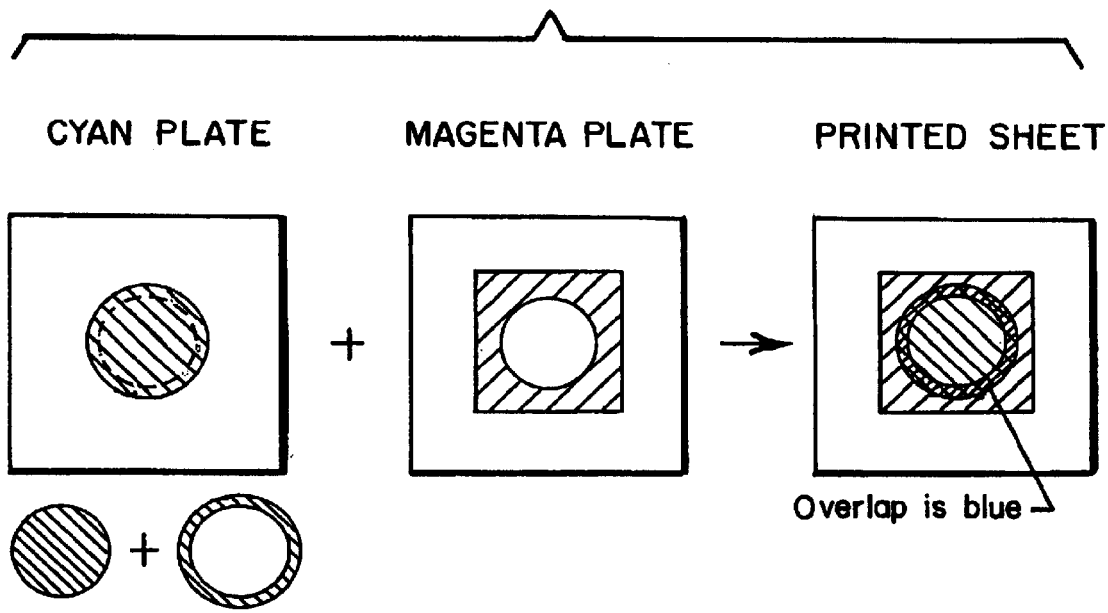
FIG. 3 schematically illustrates, with reference to the example of FIG. 1, application of a trap to reduce the visual effect of the mis-registration shown in FIG. 2.
Figure 4:
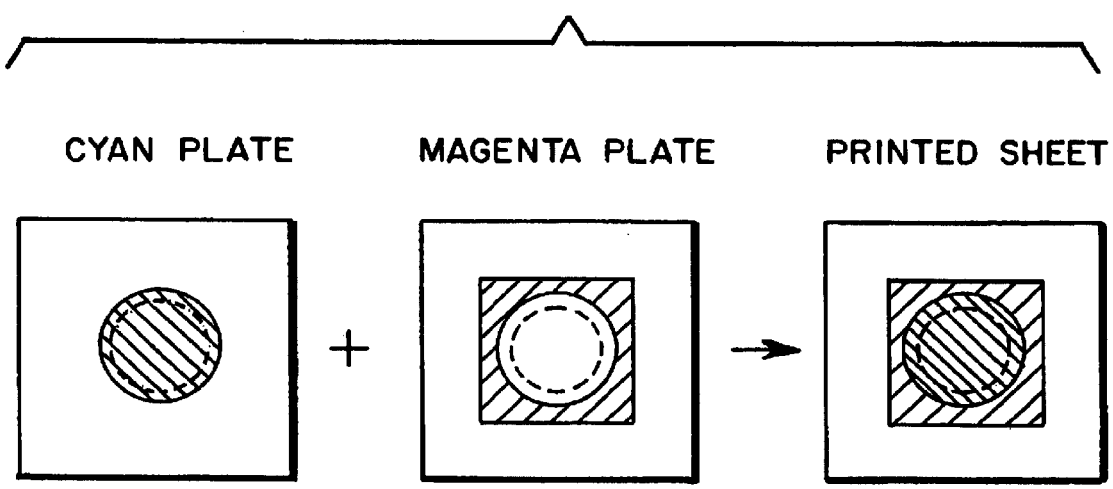
FIG. 4 schematically illustrates, with reference to the example of FIG. 1, how the trap would be lost if all its colorants had to be rendered opaquely.
Figure 5:
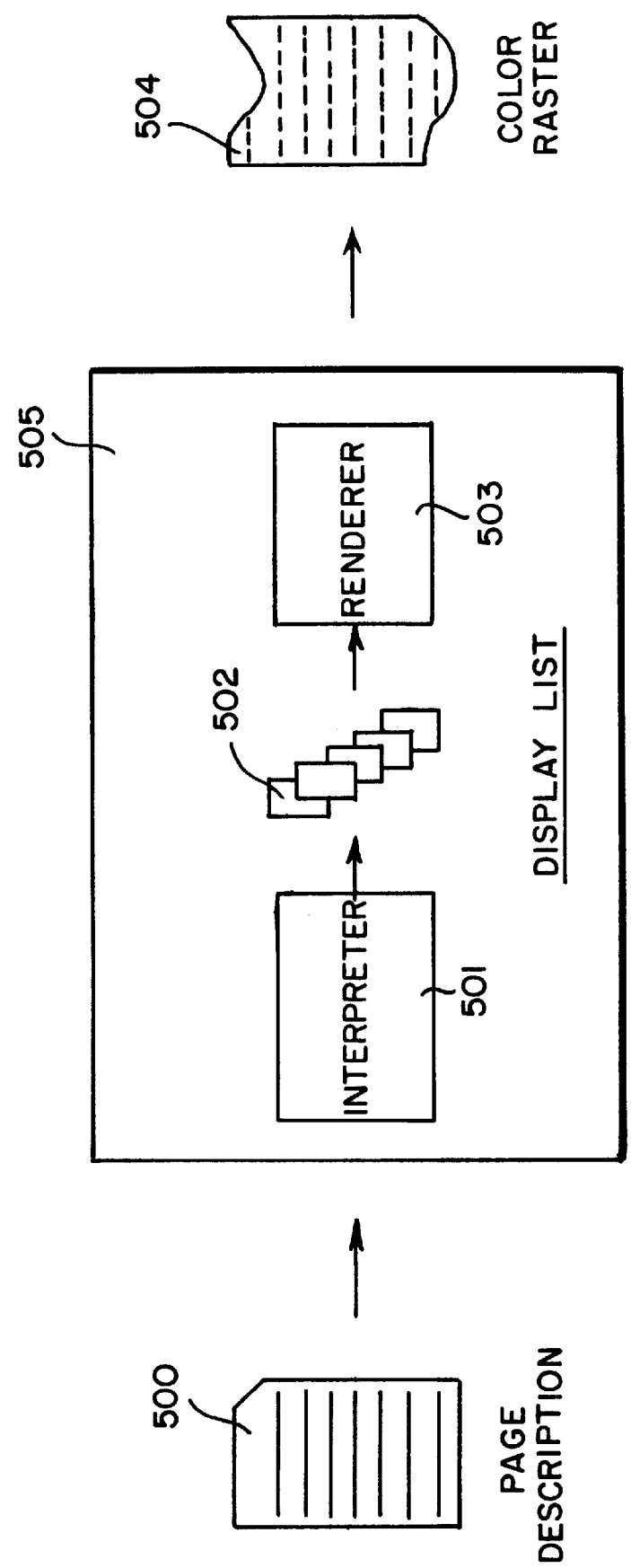
FIG. 5 schematically illustrates a process of converting a page description to a raster in a raster image processor (RIP), in accordance with an embodiment of the present invention.

Referring to FIG. 5, a page description 500 is processed to produce a display list 502 in an interpreter portion 501 (interpreter) of a raster image processor 505. Display list 502 is a further description of the page, i.e., including a re-representation of the shapes described in the original page description, stored in a memory of the raster image processor. This format is more suitable than the original page description for forming marks on the desired raster. In particular, the shapes represented on display list 502 are preferably related directly to the coordinate system of the final raster, rather than being independent of the raster as in the original page description, and the colors of the shapes are related to the colorants to be represented in the final raster.

Once display list 502 has been prepared, a rendering portion 503 (renderer) of the raster image processor produces a raster 504 according to the required image format, e.g., continuous tone or halftone. The image format also defines how the color components of each pixel are to be positioned relative to each other in raster 504. Raster 504 is produced by converting each shape in the display list into a set of pixels in the raster, using processes as are known in the art, e.g., scan conversion and "halftoning".

FIGS. 6–11 illustrate shape and color representations in accordance with the present invention for the image of a Cyan circle on a Magenta background, as defined above with reference to FIGS. 1–4.

Figure 6:
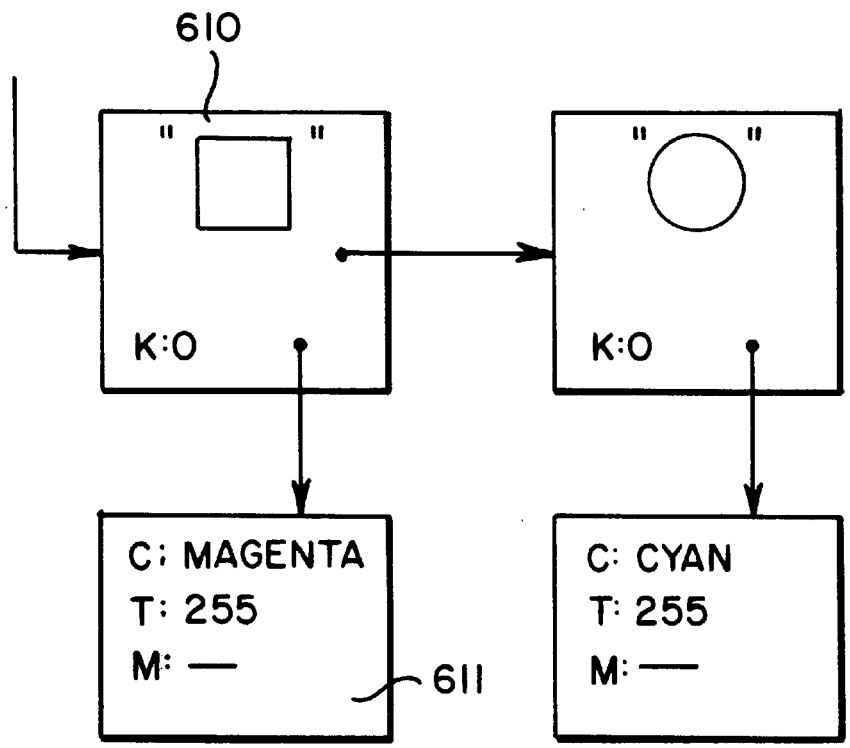
FIG. 6 schematically illustrates storing shapes and their corresponding colors on a display list, in accordance with an embodiment of the invention.
Figure 7:
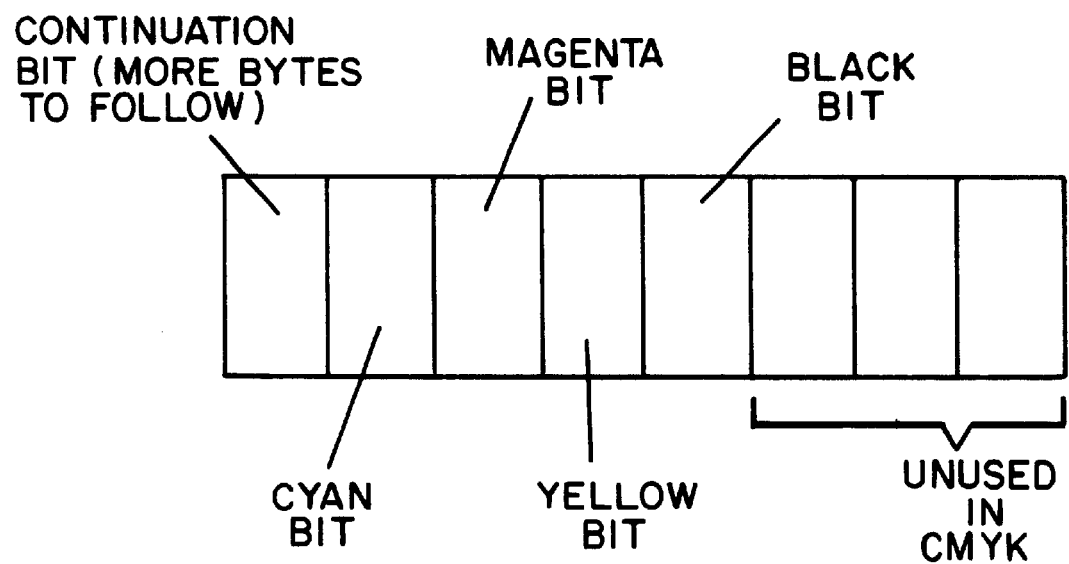
FIG. 7 schematically illustrates organization of color descriptions in accordance with an embodiment of the invention.

FIG. 6 illustrates a portion of display list 502 in more detail. The display list stores a list of shapes in the order in which they are to be rendered in the raster, for the most-part, in the chronological order in which the shapes are encountered when processing the original page description. This means that shapes described later in the original description would appear later in the display list and would generally obliterate the earlier shapes when rendered. The display list is preferably organized such that a raster would be rendered running from top to bottom of the page being printed.

The representation of each shape, for example shape 610, on the display list is associated with a corresponding color representation, 611. Color representation 611 may contain information lists pertinent to the subject matter of the invention. These lists are: (1) a colorant list, C, listing the colorants which form the color of the shape; (2) a tint list, T, listing the tint values (i.e., amounts) of each of the colorants; and (3) a sub-list, M, of the colorants in list C whose tint values are to be combined with those of the background in accordance with a "maximum" rule, as defined below, rather than obliterating the background.

As further shown in FIG. 6, shape 610 contains a single flag, K, which indicates whether colorants not included in colorant list C should cause a knock out (i.e., whether to obliterate the contents of a part of the raster corresponding to such colorants), or whether those colorants should be ignored (i.e., overprinted) leaving the contents of the raster undisturbed.

Color description 611 is preferably stored separately from shape description 610, but is preferably referenced by the shape description. It is appreciated that a number of shapes may have the same color and, therefore, a plurality of shapes may share a common color description, thereby conserving computer memory.

Both lists of colorants, C and M, are preferably represented as an array of bytes, one bit in each byte being assigned for each colorant, wherein each bit in each byte is set to either "1", if the corresponding colorant is used to form the color of the shape, or "0", if the corresponding colorant is not used. One bit in each byte indicates whether another byte follows; otherwise any remaining possible colorants are assumed not to be included in the color to the printed. This arrangement is illustrated schematically in FIG. 7.

Figure 8:
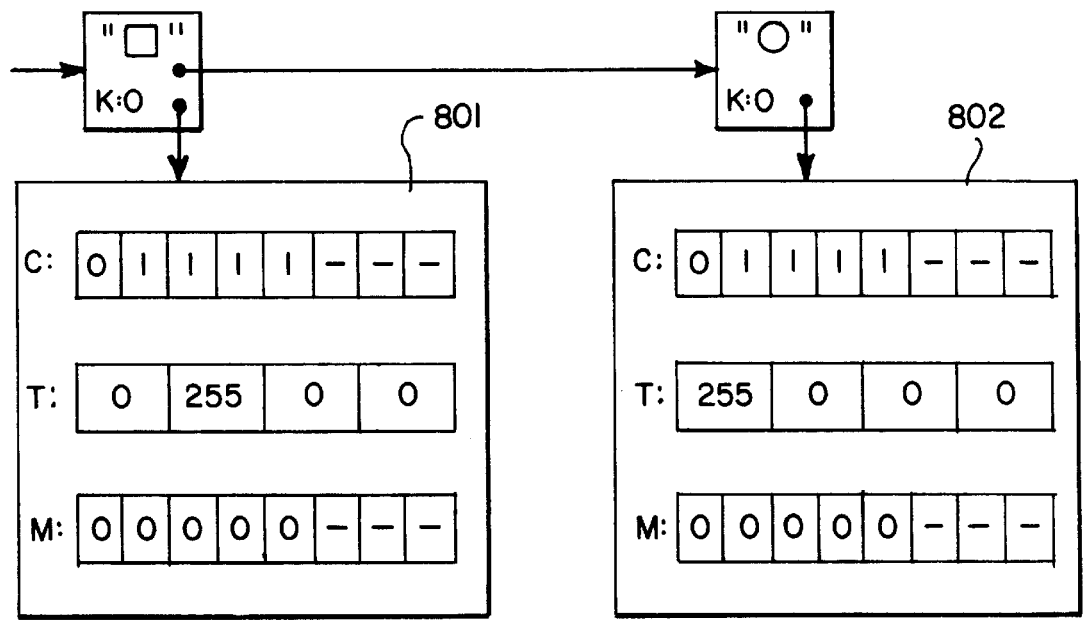
FIG. 8 schematically illustrates an example of describing a color using the PostScript language operator "setcmykcolor", in accordance with an embodiment of the invention.

For example, as illustrated in FIG. 8, the Magenta square may be generated using the PostScript language color "0 10 0 setcmykcolor", then a first color list, 801 C, would contain all four colorants, Cyan, Magenta, Yellow and Black, represented as 4×1 bits. If the output is to a 4×8 bit continuous tone raster, the color values in a tint list 801T would be 0, 255, 0 and 0, respectively. Because no maximum rule colorants are needed in this example, colorant sub-list 801M is empty. In this example, the Magenta square would knockout any background and, therefore, flag K of the shape description is set to zero.

Figure 9:
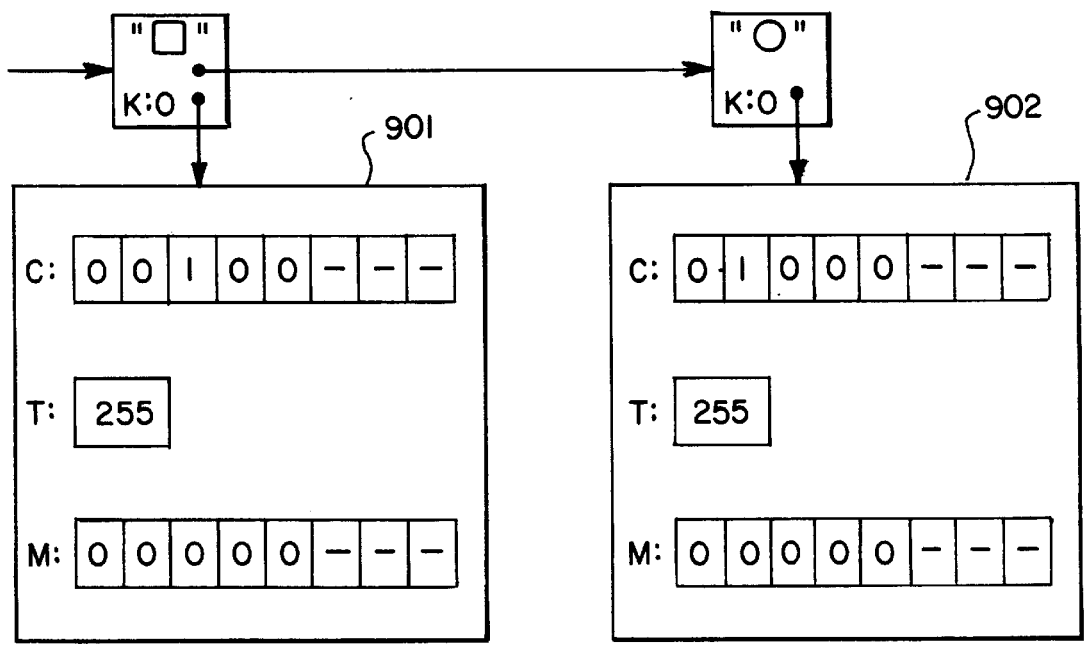
FIG. 9 schematically illustrates describing a color using Separation color space, in accordance with an embodiment of the invention.

In another example, illustrated in FIG. 9, the color of the square is expressed as "[/Separation/Magenta/DeviceCMYK { 0 exch 0 0 }] set color space 1 setcolor", i.e., only the Magenta colorant is specified, so that color list 901C contains only the bit representing Magenta, with a corresponding tint value of 255 in list 901T. Here, too, there are no maximum-rule colorants and, thus, sub-list 901M is empty. The square would also knockout any background so the flag K is set accordingly.

The two description variations, as applied to the Cyan circle of the image are illustrated schematically as elements 802 and 902 in FIGS. 8 and 9, respectively.

Traps which extend some of the colorants of a shape to overlap with the remaining colorants of the background are preferably drawn using a thin line along a path which forms an outline of the shape. The outline is preferably in the color of the shape after applying the PostScript language operation "true setoverprint". This operation changes the behavior of colorants not present in the shape prior to color transformation, such that the background is left unchanged instead of knocking out a white area in those colorants.

Figure 10:
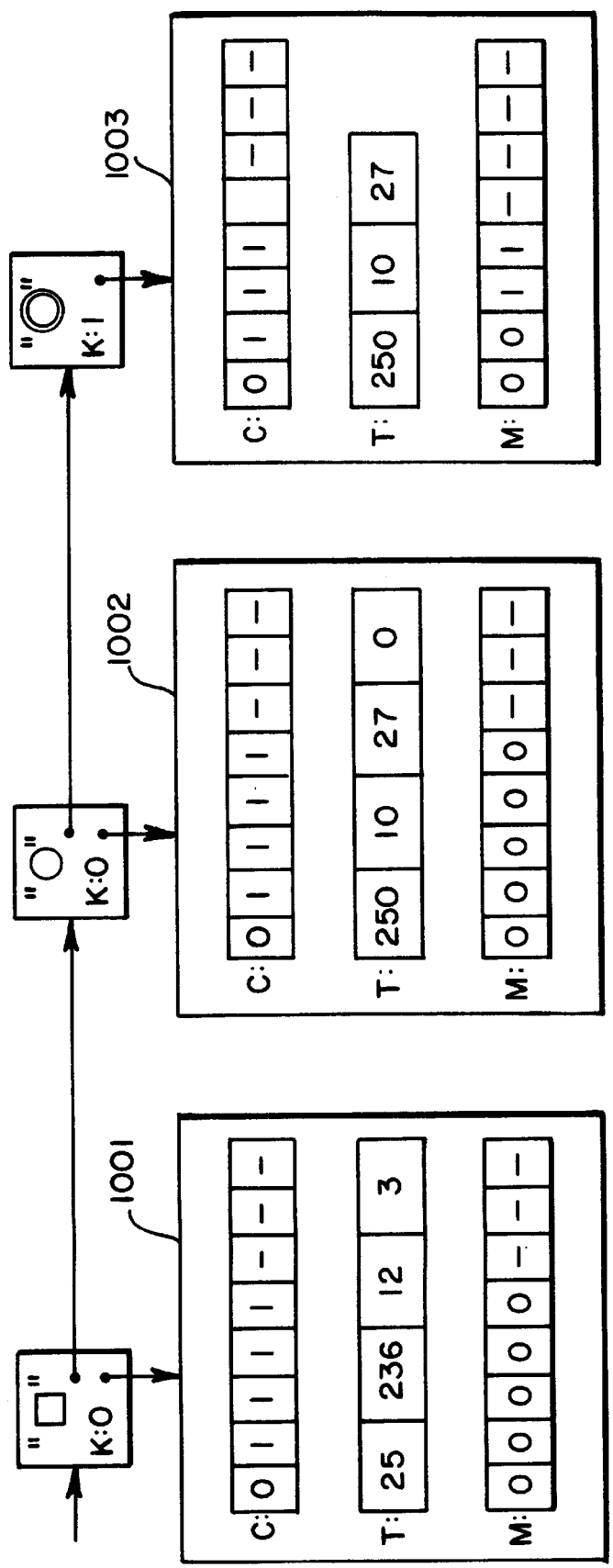
FIG. 10 schematically illustrates an example of a display list including a trapped shape, in accordance with an embodiment of the invention.

FIG. 10 shows an example of a display list for the Magenta square, the Cyan circle, and an annular Cyan trap.

The flag of the trap, 1003K, is set to overprint ("1") rather than to knockout ("0"); however, the color representation of the trap is otherwise the same as that of the Cyan circle. An extension of the PostScript language may be used to enable a "setcmykcolor" operation whenever "true setoverprint" is applied to zero-valued operands, as if those colorants are absent, resulting in overprinting of the region. Hence in shape 1003 the color list C is set to "0111–." Alternatively, the Separation form of "setcolorspace" may be used without such extension; however, this alternative is currently not suitable for most applications because the Separation form of "setcolorspace" has not been adopted in most publishing applications.

When color transformation is applied, the colors of shapes described in PostScript or PDF language pages may be adjusted (and the resulting color information stored in the display list) to appear either more aesthetically pleasing, or similar to the color the shape would have in a different printing process, or according to any other desired criteria. Any suitable color transformation methods, as are known in the art, may be used in conjunction with the present invention. The effect of the color transformation may be that, for example, colorants specified as zero-valued in the PostScript language are not zero-valued in the display list, as illustrated schematically in FIG. 10. In this example, instead of "0 10 0 0 setcmykcolor" for the Magenta square translating to 0, 255, 0, 0, as indicated at 901T (FIG. 9), the output may be translated 25, 236, 12, 3, as indicated at 1001T (FIG. 10). Similarly, –1 0 0 0 setcmykcolor, for the Cyan circle and its trap, may translate to 250, 10, 27, 0, as indicated at 1002T (FIG. 10), instead of 255, 0, 0, 0, as indicated at 902T (FIG. 9). The color transformation needed in order to reproduce the color of the Cyan circle, in the above example, is 10 units of Magenta, 27 units of Yellow, and only 250 units of Cyan ink.

The meaning of the transformation defined above is that 10 units of Magenta in the trap area are generally required in order to correctly reproduce the color of the trap, yet not to overlap with the Magenta of the square. This results in either of two options: (1) not to reproduce the trap at all in order to avoid reproducing a larger shape (i.e., a larger Cyan circle) having the same problem at the borders as the original shape; or (2) the 10 units of Magenta may be ignored and an incorrect color would be produced around the borders of shape being trapped. In a preferred embodiment of the invention, in contrast, all shapes are stored with their correctly adjusted color. Thus, the circle which was Cyan only, in the absence of color transformation, may include the other colorants produced by the color adjustment in the color list C, and the corresponding tint values in the tint list T. In shapes for which overprinting is enabled, color lists M may be used to store the identities of colorants which are present only due to the color transformation. Flag 1003K of the trap description is set to overprint (i.e., "1") indicating the behavior of colorants which are still absent after the color transformation. Thus, in the above example, color list 1003M would contain 1 bits corresponding to Magenta and Yellow, the two colorants introduced by color transformation.

Once the display list is complete, the rendering process continues by creating a raster. For shapes that do not have any colorants specified in color list M, the raster is generated by producing the required amounts of color for the pixels occupied by each shape (in continuous tone printers), or by producing the required combination of 0 and 1 valued pixels which would result in the appropriate halftone pattern for the area occupied by each shape (in halftone printers).

To produce the raster when a shape has colorants specified in its color list M, the rendering process of the invention is augmented. In continuous tone printers, for each colorant not present in color list M, the pixels in the area of the shape are filled with the colorant tint for the shape as specified in the display list. However, for the colorants present in color list M, the corresponding tint value from tint list T is compared with the tint value of each pixel in the shape, i.e., the background produced by the rendering of previous shapes from the display list. If the colorant of a pixel of the background is darker than or the same as the colorant of the shape (i.e., the tint value of the background pixel is larger than or equal to the tint value of the shape being rendered), the pixel is left unchanged. If the background pixel tint is lighter than the shape tint, the tint value of the shape is used for the pixel in the raster. It is appreciated that the tint value of the background typically varies from pixel to pixel and, thus, the choice of foreground or background tint value may vary from pixel to pixel across the shape.

Figure 11:
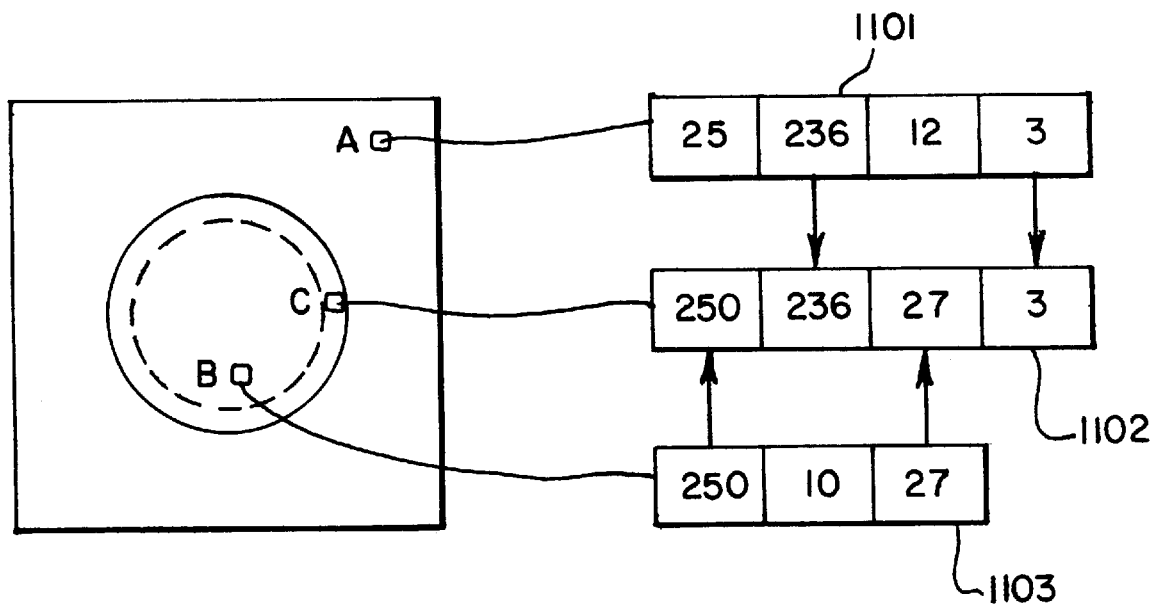
FIG. 11 schematically illustrates an example of the effect of combining colorants using a maximum rule, in accordance with an embodiment of the invention.

FIG. 11 schematically illustrates rendering of a trap line for the Cyan circle on the Magenta square example. In this example, as indicated at A, areas having a Magenta tint value of 236, arising from the Magenta square, retain their background tint. Similarly, as indicated at B, areas having a Magenta tint value of 10, arising from the Cyan circle are also left unchanged. In contrast, as indicated at C, areas covered by the Cyan trap having a Yellow value of 12, arising from the Magenta square, are replaced by a Yellow tint of 27 in the trap. The pixels in the area indicated C having Cyan tint value 25 due to the Magenta square are replaced by the tint value 250 triggered by the M list value 0. However, the pixels in area C having Black tint value 3 are unchanged because the zero colorant in the shape has the effect of transparency according to the "setcmykcolor" extension. This means that in the area where the trap line overlaps with the square, the color will turn out to be 250, 236, 27, 3. Therefore, if any mis-registration occurs, there will be an area of the circle color to fill the gap and there will be a darker color in overlapping areas.

It is appreciated that the color of the overlapping area thus reproduced is not exactly the same as it would be if reproduced by a color transformation of the Cyan value of 1 in the PostScript language page description from the Cyan circle and 1 from the Magenta square. However, the color of the overprinted areas is sufficiently close, visually, to indicate the presence of a trap in the proof and to indicate the color of the trap.

When applying the method of the invention to halftoning printers, the value of each pixel of a shape is determined to be either "on" (i.e., "1") or "off" (i.e., "0") by applying the tint value of the shape to a spot function or threshold array that describes the halftone pattern and the location of the pixel in a raster grid. In halftone printers, the method does not involve a comparison of the tint value of each pixel in the shape, as in continuous tone printers, because each pixel of both the shape and the background is represented as either a "0" or a "1". In other words, a halftoning algorithm may be used to spread the tint value information across a large number of pixels so that when averaged by the eye the viewer perceives the tint.

Some known halftoning algorithms include an intermediate step of constructing a continuous tone raster representation of the image to be printed and, subsequently, applying a halftoning function to the continuous tone representation. The intermediate continuous tone raster is typically constructed in stages, e.g., in successive small sections, to avoid an undue memory burden. The intermediate continuous tone raster may be produced as described above with reference to continuous tone printers.

In a preferred embodiment of the invention, the halftone pixels are reproduced directly from the tint value and pixel locations. According to this embodiment, for each colorant identified in the color list M of a given shape, the pixels of the background (which are all either "0" or "1") are preferably combined disjunctively (i.e., using a boolean "OR" function) with the corresponding pixel values of the shape. Assuming that the same spot function or threshold array is used to produce both the pixels of the background and the foreground, this method has substantially the same effect as taking the maximum value for each pixel, as described above. However, this method is more efficient because computer instructions make it possible to perform many such operations at the same time by applying the "OR" function to all the bits of a "word" representing many consecutive pixels.

Figure 12:
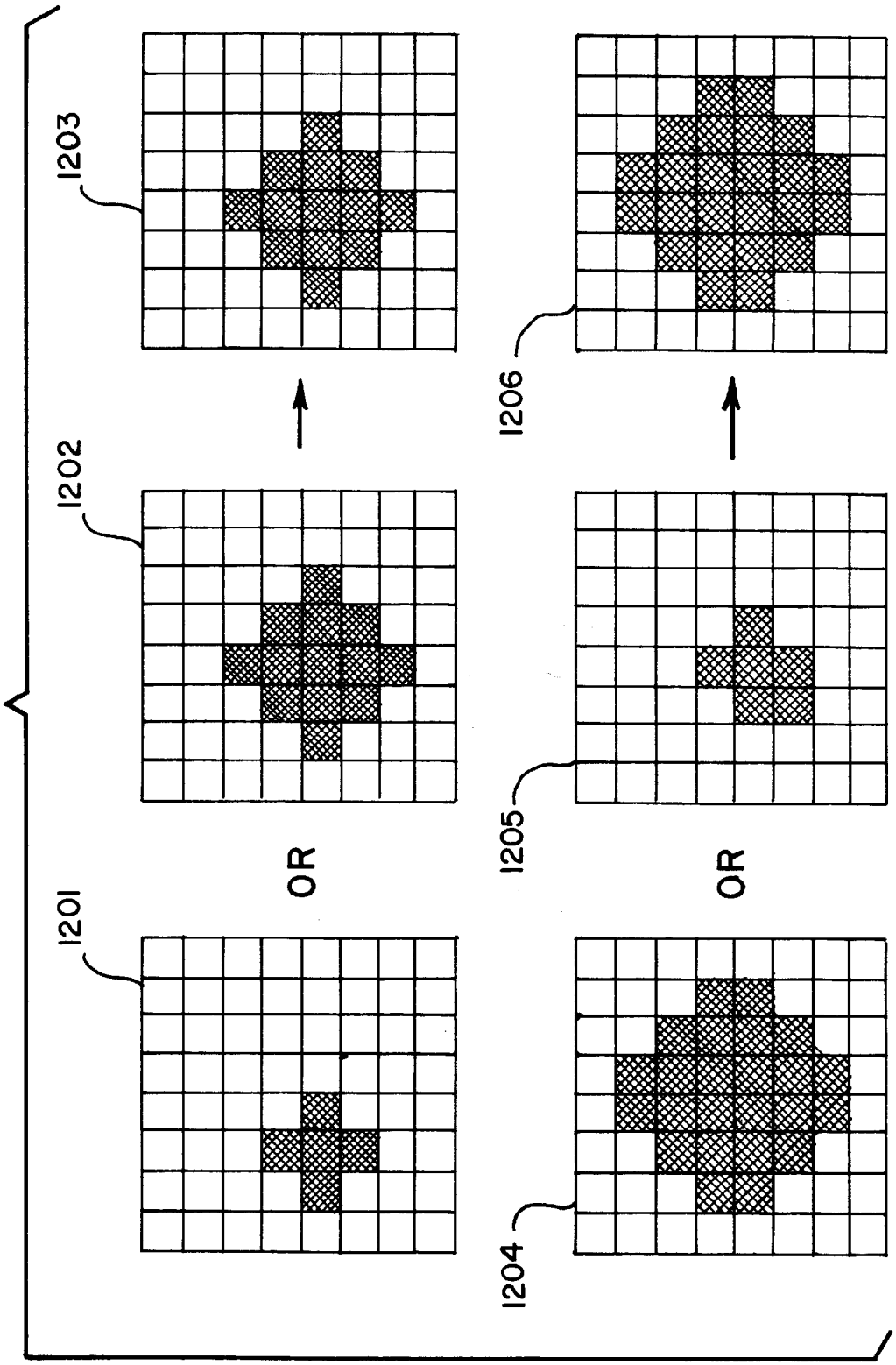
FIG. 12 schematically illustrates using a boolean 'OR' operation to generate the maximum of the tints represented by a halftoned area of a raster, in accordance with an embodiment of the invention.

It should be appreciated that the method described above is possible because spot functions and threshold arrays operate by adding to a set of pixels which are turned "on" over an area. Therefore, the "OR" operation may either obliterate "0" pixels of the background with "1" pixels of the foreground, or cause no change at all. Typically, although not necessarily, pixels are turned "on" such that they form a growing clump, or "screen dot", as the corresponding tint value increases. FIG. 12 schematically illustrates the effect of applying such an "OR" function over an area of pixels. As shown in FIG. 12, lighter tints (i.e., tints having smaller screen dots) 1201 are subsumed entirely by the larger screen dots of the background 1202, whereas darker tints (i.e., tints having larger screen dots) 1204 subsume the smaller screen dots of the background 1205.

Figure 13:
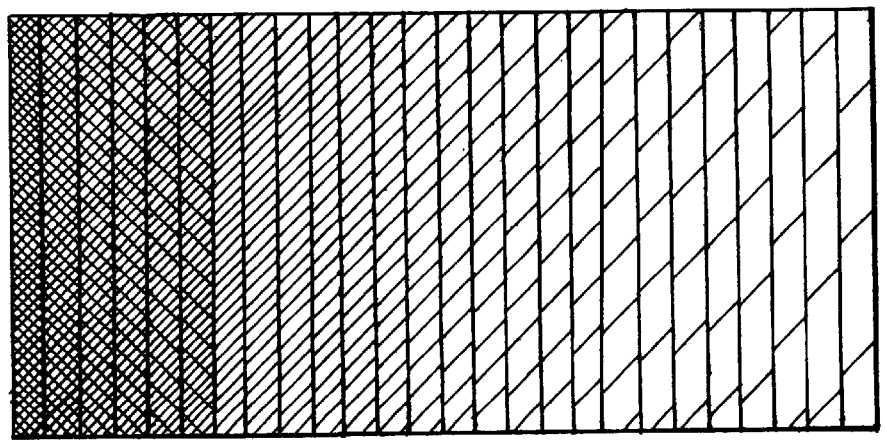
FIG. 13 schematically illustrates PostScript language representation of a vignette, in accordance with an embodiment of the invention.

Vignettes are often described in PostScript language by a series of abutting thin shapes, wherein the color of each shape is slightly different from adjacent shapes, as shown schematically in FIG. 13. In order to overprint a vignette in which the different colors are expressed using a PostScript language "DeviceCMYK" color space (e.g., "setcmykcolor") and the overprinted colorants are determined by zero-valued tints, it is necessary to ensure that each colorant is overprinted either for all shapes of the vignette or for none of the shapes. Such vignettes may be detected by comparing the location of the shapes and their proximity within the page description file, as well as the rate of color change within the vignette. When a vignette is so identified, we preferably form an intersection of the set of overprinted colorants in the color list M of each of the constituent shapes in display list entries, and apply the intersected set to all the constituent shapes.

Figure 14:
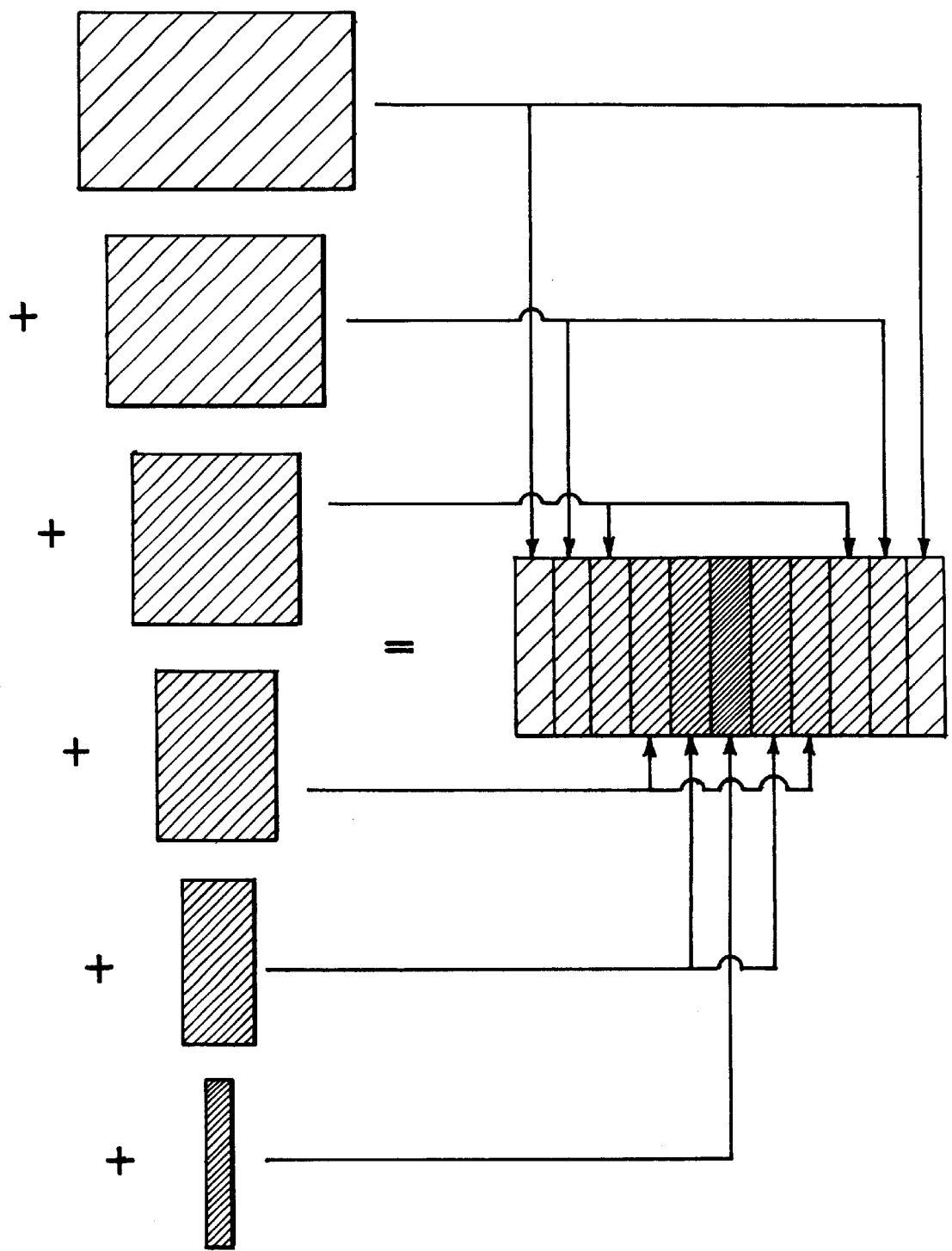
FIG. 14 schematically illustrates PostScript language representation of a vignette composed of elements each enclosing subsequent elements, in accordance with an embodiment of the present invention.

Other vignettes may be described in PostScript language by a series of shapes of slightly varying colors, each shape being slightly smaller than and fully enclosed by a preceding shape, as illustrated schematically in FIG. 14. In accordance with the methods described above, when overprinting such a vignette of successively enclosed shapes, in certain colors it may be a drawback that, for example, a darker colorant of the outermost shape in the vignette would "show through" any lighter tint of the same colorant in all the enclosed smaller shapes of the vignette. Due to the structure of such vignettes, each shape forms the background for the next shape in the series. Therefore, in an embodiment of the invention, such vignettes are detected by comparing the location of the shapes, their proximity within the page description file, the rate of color change between shapes, and the enclosure of shapes within other shapes. When this type of vignette is identified, the display list is preferably further adjusted to render the component shapes in a reverse order, wherein each shape is clipped according to the outline of the next enclosed shape rather than being clipped according to the previous enclosing shape, as is the case when reversal is not applied. This does not change the appearance of the vignette shapes, yet it prevents overlaps between the shapes and, thus, it prevents interference of colorants between the shapes.

In accordance with some embodiments of the invention, it is desired to produce negative images of the described page, in which originally dark tints appear light and vice versa. Such negative pages may then be used, for example, as masks for photographically exposing a further medium to produce a positive image. Although proofs are rarely required in negative image applications, the method of the present invention may be modified to adapt for such proofs. The method of producing negative proofs is essentially the same method used for positives, except that the above described "maximum" or "larger of" tint selection rule is replaced with a "minimum" or "smaller of" tint selection rule.

Therefore, when producing negatives in continuous tone rasters, the foreground and background pixels are compared and the minimum of the two tint values is preferably stored in the raster. For halftoned rasters, instead of the Boolean "OR" operation, a boolean "AND" operation is used, whereby the minimum of 0 or 1 is selected for each relevant colorant of each pixel of the foreground and background in the area covered by each shape.

While the method and systems of the present invention are described above in the context of efficient printing of proof traps, it will be appreciated by persons skilled in the art that the method applies also to larger areas of colorant overprinted on a background whenever color transformations are applied. Applying the invention in such cases may be useful in producing a reasonable proof that provides approximations of colors over a large area. This making discrepancies in color accuracy more obvious to the viewer than they would have been if color transformation were to be applied to the colorant combination resulting from the foreground and background colorants prior to the color transformation.

It will be appreciated by persons of ordinary skill in the art that the present invention is not limit to the specific embodiments described above, with reference to the accompanying drawings, and that other variations, modifications and combinations of the methods and systems described above are also within the scope of the present invention. For example, it should be appreciated that the present invention is not limited to printing of proofs and may also be implemented in conjunction with final printing.

What is claimed is:

1. A method for handling overriding of colored shapes having at least one shape that is set to overprint while generating a raster page of pixels, the method comprising the steps of:
   determining a tint of each colorant for one of said colored shapes using a color transformation;
   setting values of a pixel that is covered by the shape, when the shape is not set to overprint, based on the tint of each colorant for the shape;
   resetting the values of said pixel that is covered by the shape, when the shape is set to overprint, based on the tint of each colorant for the shape, if the tint of that colorant for the shape is darker than the tint corresponding to a previously set value for the pixel.

2. A method for reproducing colored shapes on a page defined by a page description, the method comprising the steps of:

applying color transformations to each of said colored shapes, to produce tints corresponding the colorants for each of said shapes; setting at least one of said shapes to overprint in accordance with said page description; determining for each of said colorants for each of said shapes whether colorant arises from said color transformation;

determining for each of said colorants for each of said shapes whether a colorant is set to overprint;

generating a raster page comprising a plurality of pixels based on said color transformations an said overprint settings; setting a tint value corresponding to a colorant for a pixel covered by said shape based on said tint value corresponding to said colorant for the shape, when the colorant for the shape is not set to overprint and the colorant for the shape does not arise from said color transformation; and setting the tint value corresponding to the colorant for the pixel covered by said shape based on selecting a maximum of said tint value corresponding to said colorant for said shape and said tint value corresponding to a previously determined value for said pixel for the raster page, when the shape is set to overprint and the colorant of the shape arises from said color transformation.

3. The method of claim 2, further comprising performing said applying step for each of said shapes independently of said overprint settings.

4. The method of claim 2, further comprising the step of rendering sad raster page using continuous tone.

5. The method of claim 2, further comprising the steps of:

detecting in said page a vignette comprising a plurality of constituent shapes by evaluating said page description comprising locations for said shapes, proximity of said shapes and rate of color change among said shapes; and adjusting said overprint settings for said colorants for said constituent shapes of said vignette such that only those colorants that are set to overprint in all of said constituent shapes are set to overprint in any of said constituent shapes.

6. The method of claim 2, further comprising the steps of:

detecting said page a vignette comprising a series of successively enclosing construent shapes based on said page description comparing locations of said shapes, proximity of said shapes, rate of color change among said shapes, and enclosure relationships among said shapes; and adjusting said construent shapes of said vignette such that said colorant of said constituent shapes do not affect each other when said vignette is overprinted.

7. A method for reproducing colored shapes on a halftone screened page defined by a page description, the method comprising the shapes of:

selecting a halftone function capable of generating a halftone pattern for tint of each colorant for each of said colored shapes;

setting at lest one of said shapes to overprint in accordance with said page description; and generating a raster page comprising a plurality of pixels based on said halftone function and said at least one overprint setting; wherein setting a values for said pixels covered by a shape, when said shape is not set to overprint, in accordance with the half-tone pattern appropriate to the tint of each colorant for said shape; and resetting the values for the pixels covered by said shape, when said shape is set to overprint, in accordance with a maximum of the half-tone pattern appropriate to the tint of each colorant for said shape and previously determined values for the corresponding pixels in the raster page.

8. The method of claim 7, further comprising the step of determining said maximum by applying a boolean "OR" operation.

9. A method for producing a negative image of colored shapes on a page defined by a page description, the method comprising the steps of:

applying color transformations to each of said colored shapes, to produce tints corresponding to colorants for each of said shapes;

setting at least one of said shapes to overprint in accordance with said page description;

determining for each of said colorants for each of said shapes whether a colorant arises from said color transformations;

determine for each of said colorants for each of said shapes whether a colorant is set to overprint;

generating a raster page comprising a plurality of pixels based on said color transformations and said overprint settings; wherein:

setting a tint value corresponding to a colorant for a pixel covered by said shape based on said tint value corresponding to said colorant for the shape, when the colorant for the shape is not set to overprint and the colorant for the shape does not arise from said color transformations; and setting the tint value corresponding to the colorant for the pixel covered by said shape based on selecting a minimum of said tint value corresponding to said colorant for said shape said tint value corresponding to a previously determined value said pixel, when the shape is set to overprint and the colorant of the shape arises from said color transformation.

10. A method of claim 9, further comprising the step of rendering tint values of the pixels of the raster page using halftone screening to apply halftone patterns.

11. A method of claim 10, further comprising determining said minimum by applying a boolean "AND" operation between the half-tone pattern appropriate to the tint for the colorant for the shape and previously determined values for the corresponding pixels in the raster page.

12. The method of claim 9, further comprising the step of rendering said raster page using continuous tone.

13. A system for handling overprinting while generating a raster page of pixels, the system comprising:

a page description using a page description language to define a plurality of colored shapes having at least one of said shapes to overprint;

an interpreter for generating a display list in accordance with said page description by applying color transformation, such that said display list relates said shapes to a coordinate system of said raster page and relates said shapes to the corresponding to colorants; and a renderer for producing said raster page according to a required image format by defining values for each of said pixels in accordance with said display list and in accordance with the following rule:

setting values for the pixels that are covered by a shape, when the shape is not set to overprint, according to the tints of the colorants for the shape; and resetting the values of the pixels that are covered by the shape, when the shape is set to overprint, based on the tints of the colorants for the shape, if tints of the colorants for the shape are darker than the tints of the colorants corresponding to a previously set values for the pixels.

14. The system as claim 13, wherein said required image format is one of a continuous tone and a halftone.

15. A system for reproducing colored shapes on a page defined by a page description, said system comprising:

a processor; and a memory in operative connection with the processor for storing processing instructions enabling the processor to:

apply color transformations to each of said colored shapes, to produce tints corresponding to colorants for each of said shapes;

set at least one of said shapes to overprint in accordance with said page description;

determine for each of said colorants for each of said shapes whether a colorant arises from said color transformations; and generate a raster page comprising a plurality of pixels based on said color transformations and said overprint settings; wherein:

setting a tint value corresponding to a colorant for a pixel covered by said shape based on said tint value corresponding to said colorant for the shape, when the colorant for the shape is not set to overprint and the colorant for the shape does not arise from said color transformation; and setting the tint value corresponding to the colorant for the pixel covered by said shape based on selecting a maximum of said tint value corresponding to said colorant for said shape and said tint value corresponding to a previously determined value for said pixel, when the shape is set to overprint and the colorant arises from said color transformations.

* * * * *